US011864574B1

United States Patent
Ibrahim et al.

(10) Patent No.: US 11,864,574 B1
(45) Date of Patent: Jan. 9, 2024

(54) ENCAPSULATED POLYPHENOLIC COMPOUNDS

(71) Applicant: KING FAISAL UNIVERSITY, Al-Ahsa (SA)

(72) Inventors: Marwa Ezz El-Din Ibrahim, Al-Ahsa (SA); Randah Miqbil Alqurashi, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/203,444

(22) Filed: Jun. 20, 2023

(51) Int. Cl.
*A23L 3/44* (2006.01)
*A23L 29/00* (2016.01)
*A23L 19/00* (2016.01)

(52) U.S. Cl.
CPC .............. *A23L 3/44* (2013.01); *A23L 19/07* (2016.08); *A23L 29/035* (2016.08)

(58) Field of Classification Search
None
See application file for complete search history.

(56) References Cited

U.S. PATENT DOCUMENTS

2022/0143192 A1* 5/2022 Di Stefano ............ A61K 47/38

OTHER PUBLICATIONS

Sikdar: Extraction of Citrus Oil From Orange (*Citrus Sinensis*) Peels by Steam Distillation and Its Characterizations; International Journal of Technical Research and Applications; vol. 4, Issue 3 (May-Jun. 2016), pp. 341-346 (Year: 2016).*
Kumar: Efects of drying methods and solvent extraction on quantifcation of major bioactive compounds in pomegranate peel waste using HPLC; (2022) 12:8000. (Year: 2022).*
Klinge Corp.: Ultra-Low Temperature Freezer Storage; online at least by Aug. 4, 2020 at: https://web.archive.org/web/20200804085456/ https://klingecorp.com/pharma/ultra-low-temperature-freezer-storage/ (Year: 2020).*
Pasandide: Pectin extraction from citron peel: optimization by Box-Behnken response surface design; Food Sci Biotechnol (2018) 27(4):997-1005. (Year: 2018).*

(Continued)

*Primary Examiner* — Patricia A George
(74) *Attorney, Agent, or Firm* — Nath, Goldberg & Meyer; Richard C. Litman

(57) ABSTRACT

Encapsulated polyphenolic compounds and a method of making said encapsulated polyphenolic compounds are provided. The encapsulated polyphenolic compounds include polyphenolic compounds encapsulated in natural fibers, the encapsulated polyphenolic compounds imparting improved stability to the encapsulated polyphenolic compounds. The polyphenolic compounds may be extracted from natural sources, such as pomegranate peels. The encapsulating natural fibers may also be obtained from natural sources, such as orange peel fibers. The method of encapsulation includes mixing an extract containing polyphenolic compounds with ground, dried orange peel powder, freeze-drying the mixture to obtain a first encapsulated polyphenolic compound, and mixing the first encapsulated polyphenolic compound with the extract containing polyphenolic compounds and repeating the freeze-drying to obtain the final encapsulated polyphenolic compounds.

12 Claims, 1 Drawing Sheet

(56) References Cited

OTHER PUBLICATIONS

Thomas: Loss-on-Drying Method; published at least by Jul. 4, 2018 at: web.archive.org/web/20180704071316/httpsJ/www.news-medical.net/life-sciences/Loss-on-Drying-Method-{LOD).aspx (Year: 2018).*
GM: published as CN 107969664 A on May 1, 2018. (Year: 2018).*
Fawole: Antibacterial, antioxidant and tyrosinase-inhibition activities of pomegranate fruit peel methanolic extract; BMC Complementary and Alternative Medicine 2012, 12:200. (Year: 2012).*
Cam: Phenolics of pomegranate peels: extraction optimization by central composite design and alpha glucosidase inhibition potentials; J Food Sci Technol (Mar. 2015) 52(3): 1489-1497 (Year: 2015).*
Kinkel; published as: WO 2020023808 A1 on Jan. 30, 2020. (Year: 2020).*
Burgain: Encapsulation of probiotic living cells: From laboratory scale to industrial applications; Journal of Food Engineering 104 (2011) 467-483. (Year: 2011).*
Buljeta: Polysaccharides as Carriers of Polyphenols: Comparison of Freeze-Drying and Spray-Drying as Encapsulation Techniques; Molecules 2022, 27, 5069. (Year: 2022).*
Mo: Pomegranate Peel as a Source of Bioactive Compounds: A Mini Review on Their Physiological Functions; Front. Nutr., Jun. 9, 2022 Sec. Nutrition and Food Science Technology, vol. 9—2022. (Year: 2022).*
Kaderides: Development and characterization of a new encapsulating agent from orange juice by-products; Food Research International 100 (2017) 612-62. (Year: 2017).*
Ballesteros, L. F. et al., "Encapsulation of antioxidant phenolic compounds extracted from spent coffee grounds by freeze-drying and spray-drying using different coating materials", Food Chemistry, 237, pp. 623-631 (2017).
Rezende, Y. R. R. S. et al., "Microencapsulation of extracts of bioactive compounds obtained from acerola (*Malpighia emarginata* DC) pulp and residue by spray and freeze drying: Chemical, morphological and chemometric characterization", Food Chemistry, 254, pp. 281-291 (2018).
Saikia, S. et al., "Optimisation of phenolic extraction from Averrhoa carambola pomace by response surface methodology and its microencapsulation by spray and freeze drying", Food Chemistry, 171, pp. 144-152 (2015).

Yu, Y., & Lv, Y., "Degradation kinetic of anthocyanins from rose (Rosa rugosa) as prepared by microencapsulation in freeze-drying and spray-drying", International Journal of Food Properties, 22(1), 2009-2021 (2019).
El-Messery, T. M. et al., "Microencapsulation of natural polyphenolic compounds extracted from apple peel and its application in yoghurt", Acta Scientiarum Polonorum Technologia Alimentaria, 18(1), pp. 25-34 (2019).
Antony, A. & Farid, M., "Effect of Temperatures on Polyphenols during Extraction," Applied Sciences 12: 2107 (2022).
Muhamad, N. et al., "Effect of drying temperatures and extraction solvents on total phenolic, flavonoid contents and antioxidant properties of immature Manis Terengganu Melon (*Cucumis melo*)", J. Agrobiotech 9(1S): pp. 114-121 (2018).
Snoussi, A. et al., "Drying methodology effect on the phenolic content, antioxidant activity of Myrtus communis L. leaves ethanol extracts and syobean oil oxidative stability", BMC Chemistry 15:31 (2021).
Goulas, V. et al., "Effect of Drying Method on the Phenolic Content and Antioxidant Capacity of Spearmint", Czech Journal of Food Sciences 31(5): pp. 509-513 (2013).
Cam, M. & Ieyer. N. C., "Phenolics of pomegranate peels: extraction optimization by central composite design and alpha glucosidase inhibition potentials", J. Food Sci. Technol. 52(3): pp. 1489-1497 (2015).
Man, G. et al., "Profiling Phenolic Composition in Pomegranate Peel From Nine Selected Cultivars Using UHPLC-QTOF-MS and UPLC-QQQ-MS", Frontiers in Nutrition 8:807447 (2022).
Kaderides, K. et al., "Stability of pomegranate peel polyphenols encapsulated in orange juice industry by-product and their incorporation in cookies," Food Chem, Apr. 25, 2020;310:125849. doi:10.1016/j.foodchem.2019.125849. Epub Nov. 11, 2019.
Kaderides, K. et al., "Encapsulation of pomegranate peel extract with a new carrier material from orange juice by-products," Journal of Food Engineering, 253: pp. 1-13 (2019).
Kaderides, K. et al., "Microwave-assisted extraction of phenolics from pomegranate peels: Optimization, kinetics, and comparison with ultrasounds extraction", Chemical Engineering & Processing: Process Intensification 137: 1-11 (2019).

\* cited by examiner

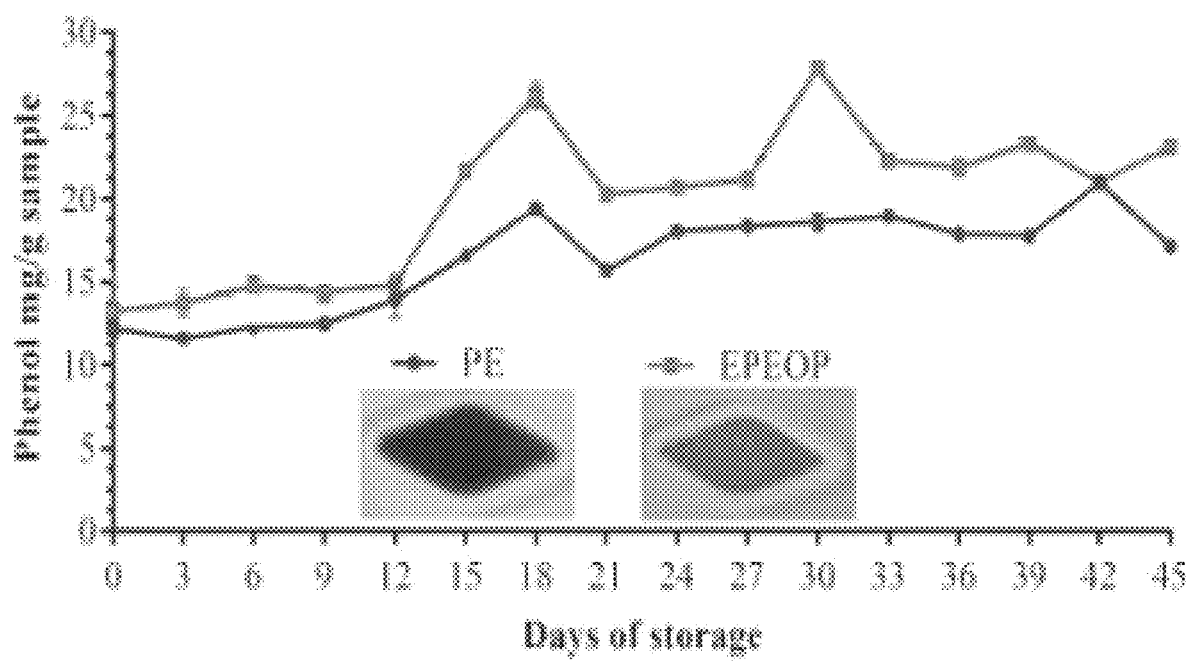

ENCAPSULATED POLYPHENOLIC COMPOUNDS

BACKGROUND

1. Field

The disclosure of the present patent application relates to compositions comprising encapsulated polyphenolic compounds having improved stability, and particularly to orange peel encapsulated pomegranate peel extracts and methods of making compositions comprising encapsulated polyphenolic compounds.

2. Description of the Related Art

In general, bioactive compounds, such as polyphenols, are of interest to scientists, functional food product developers, and consumers due to their health-promoting effects. Most of these compounds are chemically unstable. Polyphenols have been identified as food components sensitive to high temperatures; therefore, the application of heat treatments can lead to a significant reduction in the phenolic content and in antioxidant activity.

Ballesteros et al. (2017) tested spray-drying to encapsulate phenolic compounds extracted from spent coffee grounds and showed that the use of maltodextrin as a wall material achieved the best encapsulation of flavonoids (around 52%) while a combination of maltodextrin and gum Arabic was the best for encapsulation of total phenolic compounds (around 65%). Ballesteros et al. also tested freeze-drying, concluding that 100% maltodextrin as wall material was the best for encapsulation of total polyphenols and flavonoids (62% and 73%, respectively).

Rezende et al. (2018) demonstrated that microencapsulation efficiency for total polyphenol content (obtained from acerola—*Malpighia emarginata* DC) of freeze-dried samples of both pulp and residue was higher (around 68%) than for spray-dried samples; for microencapsulation efficiency of total flavonoids content, the best results (around 59%) were obtained for freeze-dried acerola residue.

Thus, encapsulated polyphenolic compounds solving the aforementioned problems are desired.

SUMMARY

The present subject matter relates to polyphenolic compositions comprising encapsulated polyphenolic compounds, having polyphenolic compounds encapsulated in natural fibers, the polyphenolic compositions imparting improved stability to the encapsulated polyphenolic compounds. The polyphenolic compounds may be extracted from natural sources, such as by way of non-limiting example pomegranate peels. The encapsulating natural fibers may also be obtained from natural sources, such as by way of non-limiting example orange peel fibers. The method of encapsulation may include mixing an extract containing polyphenolic compounds with ground, dried orange peel powder, freeze-drying the mixture to obtain a first encapsulated polyphenolic composition, and mixing the first encapsulated polyphenolic composition with the extract containing polyphenolic compounds and repeating the freeze-drying to obtain the final encapsulated polyphenolic compositions.

The resulting encapsulated polyphenolic compositions may be used as a food additive or supplement providing a source of both stable polyphenolic compounds and fiber.

In certain embodiments, the freeze-drying process may be repeated twice, with the encapsulated polyphenolic compositions being mixed a second time with the extract containing polyphenolic compounds and the freeze-drying steps being repeated.

In an embodiment, the present subject matter relates to a polyphenolic composition comprising a pomegranate extract encapsulated in dehydrated orange peel fiber; wherein the polyphenolic composition is a powder produced by freeze-drying.

In another embodiment, the present subject matter relates to a method of making an encapsulated polyphenolic composition, comprising: (a) mixing a first phenolic extract derived from pomegranate peels with a dehydrated orange peel powder to obtain a first mixture; (b) freeze drying the first mixture to obtain a first encapsulated powder; (c) mixing the first encapsulated powder with a second phenolic extract derived from pomegranate peels to obtain a second mixture; and (d) freeze drying the second mixture to obtain a second encapsulated powder comprising the encapsulated polyphenolic composition.

In a further embodiment, the present subject matter relates to an encapsulated polyphenolic composition prepared according to the methods described herein.

These and other features of the present subject matter will become readily apparent upon further review of the following specification.

BRIEF DESCRIPTION OF THE DRAWINGS

FIG. 1 is a graph showing total phenolics content of pomegranate extract (PE) and encapsulated pomegranate extract in orange peel (EPEOP) in mg/g during storage at 60° C. for 45 days.

DETAILED DESCRIPTION OF THE PREFERRED EMBODIMENTS

The following definitions are provided for the purpose of understanding the present subject matter and for construing the appended patent claims.

Definitions

As used herein, "polyphenols" or "polyphenolic compounds" refers to a family of naturally occurring phenols that occur naturally and may be extracted from plants. Polyphenols may generally include phenolic acids, flavonoids, stilbenes, and lignans. Examples of such polyphenols include flavonoids, tannic acid, and ellagitannin.

As used herein, "freeze-drying" refers to a process also commonly referred to as lyophilization or cryodesiccation, which includes pretreatment of a product (concentrating, reformulation, increasing surface area, decreasing a high vapor pressure solvent, etc. . . . ), freezing and annealing of the product (cooling the material below its triple point to ensure sublimation rather than melting), and drying (reducing pressure to sublimate ice in the product).

As used herein, "pomegranate" refers to the fruit-bearing deciduous shrub known as *Punica granatum*.

As used herein, "orange" refers to various citrus species in the family Rutaceae, including but not limited to the species *Citrus sinensis*.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having"should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising"language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to encapsulated polyphenolic compositions providing polyphenolic compounds encapsulated in natural fibers, the encapsulated polyphenolic compositions imparting improved stability to the encapsulated polyphenolic compounds. The polyphenolic compounds may be extracted from natural sources, such as by way of non-limiting example pomegranate peels. The encapsulating natural fibers may also be obtained from natural sources, such as by way of non-limiting example orange peel fibers. The method of encapsulation may include mixing an extract containing polyphenolic compounds with ground, dried orange peel powder, freeze-drying the mixture to obtain a first encapsulated polyphenolic compound, and mixing the first encapsulated polyphenolic compound with the extract containing polyphenolic compounds and repeating the freeze-drying to obtain the final encapsulated polyphenolic compositions.

The resulting encapsulated polyphenolic compositions may be used as a food additive or supplement providing a source of both stable polyphenolic compounds and fiber.

In certain embodiments, the freeze-drying process may be repeated twice, with the encapsulated polyphenolic compositions being mixed a second time with the extract containing polyphenolic compounds and the freeze-drying steps being repeated.

The use of freeze-drying in making the orange peel encapsulated pomegranate extract may result in an orange peel encapsulated pomegranate extract having improved stability of the encapsulated polyphenols, which may be protected from high temperatures, pH, alkalinity, or oxygen exposure.

The encapsulated polyphenolic compositions may be used for any purpose where polyphenolic compounds are desirable and may be particularly useful in contexts where improved stability of polyphenolic compounds is desirable. By way of non-limiting example, the orange peel encapsulated pomegranate extract may be used as an additive in food products to protect against fat oxidation, or to fortify products with additional polyphenols and fiber.

In an embodiment, the present subject matter relates to a method of making an encapsulated polyphenolic composition, comprising: mixing a first phenolic extract derived from pomegranate peels with a dehydrated orange peel powder to obtain a first mixture; freeze drying the first mixture to obtain a first encapsulated powder; mixing the first encapsulated powder with a second phenolic extract derived from pomegranate peels to obtain a second mixture; and freeze drying the second mixture to obtain a second encapsulated powder comprising the encapsulated polyphenolic composition.

In certain embodiments, the first phenolic extract derived from pomegranate peels and the second phenolic extract derived from pomegranate peels can be the same phenolic extract derived from pomegranate peels.

In certain embodiments, the first phenolic extract derived from pomegranate peels and the dehydrated orange peel powder can be mixed at a ratio between about 3:1 and about 5:1 by weight. In a particular embodiment, the ratio may be about 4:1 by weight. In other embodiments, the second phenolic extract derived from pomegranate peels and the first encapsulated powder can be mixed at a ratio of about between about 2:1 and about 4:1 weight. In a particular embodiment, the ratio may be about 3:1 by weight.

In further embodiments, the freeze drying, or lyophilization, of each of the first mixture and the second mixture can be conducted at about −30° C. to about −50° C., or about −40° C., and under a pressure of about 0.01 bar to about 0.1 bar, or about 0.05 bar, for about 24 hours. In this regard, the freeze drying of the first mixture can be completed when the first phenolic extract derived from pomegranate peels and the dehydrated orange peel powder are present at a ratio between about 6:1 and about 8:1 by weight, or a ratio of about 7:1 by weight.

In certain embodiments herein, the phenolic extract derived from pomegranate peels can be obtained by a process comprising: peeling a pomegranate to obtain pomegranate peels; drying the pomegranate peels to obtain dried pomegranate peels; grinding the dried pomegranate peels to obtain ground pomegranate peels; and extracting the phenolic extract derived from pomegranate peels by soaking the ground pomegranate peels in methanol.

In this regard, regarding the drying process, the pomegranate peels can be dried at about 35° C. to about 45° C., or about 40° C., for about 48 hours.

Regarding the grinding process, the ground pomegranate peels can have a mean diameter of about 0.05 mm to about 0.2 mm, or about 0.1 mm.

Regarding the extraction process, the ground pomegranate peels can be soaked in methanol at a ratio of about 1 g: about 8 ml to about 1 g to about 12 ml, or about 1 g: about 10 ml, of ground pomegranate peels: methanol. In certain embodiments, the methanol used in the extraction process can be 80% methanol.

In other embodiments herein, the phenolic extract derived from pomegranate peels can be obtained by a process further comprising, after the process described above: storing the ground pomegranate peels soaked in methanol in a refrigerator for multiple days with daily shaking; following the storing, percolating the ground pomegranate peels soaked in methanol multiple times until complete exhaustion; following the percolating, centrifuging the ground pomegranate peels soaked in methanol to obtain a methanolic extract; and concentrating the methanolic extract by evaporating every 100 ml of methanol to 20 ml of methanol to obtain the phenolic extract derived from pomegranate peels. Accordingly, the methanolic extraction may include storing the solution of ground pomegranate peel and methanol in a refrigerator with daily shaking, followed by percolation, centrifugation, and evaporation to obtain a pomegranate phenolic extract.

Regarding the storing step, the ground pomegranate peels soaked in methanol can be stored in the refrigerator for about 4 to about 6 days, or about 5 days, the percolating can be conducted about 5 to about 7 times, the centrifuging can occur at about 10,000 rpm for about to about 25 minutes, or about 20 minutes, and the evaporating can be conducted at about 45° C. to about 55° C., or about 50° C.

For preparing the dehydrated orange peel, the dehydrated orange peel powder can be obtained by a process comprising: peeling an orange to obtain an orange peel; separating a white inner fiber portion of the orange peel to obtain an orange pith; grinding the orange pith to obtain a ground orange pith; soaking the ground orange pith in water to obtain a soaked fibrous pith having a high water holding capacity; and dehydrating the soaked fibrous pith to obtain the dehydrated orange peel powder.

For the soaking step, the ground orange pith can be soaked in the water at about 85° C. to about 95° C., or about 90° C., for about 15 to about 25 minutes, or about 20 minutes, and the dehydrating can occur in a tray dryer at about 35° C. to about 45° C., or about 40° C., until a constant weight is maintained. The soaking should occur in heated water at a temperature below the boiling point of water.

After dehydration, the dehydrated orange peel can be kept at about −25° C. to about −35° C., or about −30° C., until use.

Also contemplated herein is an encapsulated polyphenolic composition prepared according to the methods as described above.

The encapsulated polyphenolic compositions may further include one or more additional active ingredients or carriers. As a non-limiting example, the additional ingredients may include vitamins, antioxidants, probiotics, prebiotics, or the like. Such compositions may be used as additives for food products or for use in formulating a medical food.

The encapsulated polyphenolic compositions may be better understood in view of the following examples.

EXAMPLE 1

Method of Making Orange Peel Encapsulated Pomegranate Extract

Pomegranates were peeled and the peels were dried at 40° C. for 48 hours. The dried pomegranate peels were then ground in a laboratory mill. The mean diameter of the resulting ground pomegranate peel was about 0.1 mm. The ground pomegranate peel powder was socked in 80% methanol at a ratio of 1:10 g ground pomegranate peel powder to ml methanol. The resulting methanol solution was stored in a refrigerator with daily shaking for 5 days to obtain a methanolic extract. The solids were removed from the methanol extract by percolation (repeated 5-7 times) to complete exhaustion. The methanol extract was then centrifuged at 10,000 rpm for 20 minutes and concentrated under reduced pressure using a vacuum rotary evaporator at 50° C. Evaporation proceeded until every 100 ml of starting methanol extract was concentrated to 20 ml to obtain a pomegranate phenolic extract.

Oranges (*Citrus sinensis*) were peeled, and the white inner fiber portion of the peel was separated and ground to a particle size of about 0.5 to about 1 mm and soaked in hot water (90° C.) for 20 minutes to produce a fiber with high water holding capacity. The resulting ground orange peel fiber was dehydrated in a tray dryer at 40° C. until the weight remained constant and stored at −30° C. until use.

The pomegranate phenolic extract was then added to the dehydrated orange peel powder at a ratio of 4:1, mixed well, and the resulting mixture was freeze-dried to obtain an encapsulated powder. Briefly, the mixture was frozen, then placed in a chamber at −40° C. under a pressure of 0.05 bar. In total, the freeze-drying process was completed in 24 hours. The resulting encapsulating powder was then mixed a second time with the pomegranate phenolic extract at a ratio of 3:1 (extract:powder), and the freeze-drying process was repeated as described above.

EXAMPLE 2

Experimental Evidence Demonstrating the Effectiveness of the Compositions in Increasing the Stability of the Polyphenols and/or Demonstrating Improved Features The total phenolic content of pomegranate extract and encapsulated extract changed during a period of 45 days of storage at 60° C., as shown in FIG. 1, and Table 1, below. FIG. 1 and Table 1 demonstrate the protective effect of wall material in the degradation of bioactive chemicals. The stability of the encapsulated extract was greatly increased compared to the pomegranate extract.

TABLE 1

Total phenolics content mg/g of pomegranate extract and encapsulated extract during storage at 60° C. for 45 days.

| days | PE | EPEOP |
|------|-----|-------|
| 0 | 12.19 ± 0.47$^A$ | 13.24 ± 1.55$^A$ |
| 3 | 11.62 ± 0.08$^B$ | 13.73 ± 0.75$^A$ |
| 6 | 12.30 ± 0.04$^B$ | 14.74 ± 0.64$^A$ |
| 9 | 12.49 ± 0.31$^B$ | 14.40 ± 0.57$^A$ |
| 12 | 13.92 ± 1.06$^A$ | 14.81 ± 0.62$^A$ |
| 15 | 16.58 ± 0.03$^B$ | 21.68 ± 0.27$^A$ |
| 18 | 19.43 ± 0.03$^B$ | 26.26 ± 0.72$^A$ |
| 21 | 15.69 ± 0.09$^B$ | 20.31 ± 0.09$^A$ |
| 24 | 18.03 ± 0.13$^B$ | 20.74 ± 0.13$^A$ |
| 27 | 18.34 ± 0.14$^B$ | 21.19 ± 0.10$^A$ |
| 30 | 18.60 ± 0.52$^B$ | 27.88 ± 0.11$^A$ |
| 33 | 18.97 ± 0.10$^B$ | 22.31 ± 0.15$^A$ |
| 36 | 17.89 ± 0.37$^B$ | 21.90 ± 0.51$^A$ |
| 39 | 17.76 ± 0.10$^B$ | 23.37 ± 0.03$^A$ |
| 42 | 20.98 ± 0.09$^A$ | 21.03 ± 0.10$^A$ |
| 45 | 17.13 ± 0.04$^B$ | 23.16 ± 0.06$^A$ |

PE: pomegranate extract, EPEOP: encapsulated pomegranate extract in orange peel
Means ± SD with same letters indicate non-significant differences, means with difference letters indicate statistically significant differences ($p < 0.05$) according to Duncan's post hoc test. Capital letters (B & A) indicate differences between the treatment in the same row.

It is to be understood that the encapsulated polyphenolic compounds are not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of making an encapsulated polyphenolic composition, comprising:
   (a) mixing a first phenolic extract derived from pomegranate peels with a dehydrated orange peel powder to obtain a first mixture;
   (b) freeze drying the first mixture to obtain a first encapsulated powder;
   (c) mixing the first encapsulated powder with a second phenolic extract derived from pomegranate peels to obtain a second mixture;
   (d) freeze drying the second mixture to obtain a second encapsulated powder comprising the encapsulated polyphenolic composition;
   wherein the first phenolic extract derived from pomegranate peels and the second phenolic extract derived from pomegranate peels are the same phenolic extract derived from pomegranate peels;
   wherein the phenolic extract derived from pomegranate peels is obtained by a process comprising:
   (e) peeling a pomegranate to obtain pomegranate peels;
   (f) drying the pomegranate peels to obtain dried pomegranate peels;
   (g) grinding the dried pomegranate peels to obtain ground pomegranate peels;
   (h) extracting the phenolic extract derived from pomegranate peels by soaking the ground pomegranate peels in methanol;
   wherein the method of making an encapsulated polyphenolic composition further comprises:
   (i) storing the ground pomegranate peels soaked in methanol in a refrigerator for multiple days with daily shaking;
   (j) following the storing, percolating the ground pomegranate peels soaked in methanol multiple times until complete exhaustion;
   (k) following the percolating, centrifuging the ground pomegranate peels soaked in methanol to obtain a methanolic extract; and
   (l) concentrating the methanolic extract by evaporating every 100 ml of methanol to 20 ml of methanol to obtain the phenolic extract derived from pomegranate peels.

2. The method of claim 1, wherein the first phenolic extract derived from pomegranate peels and the dehydrated orange peel powder are mixed at a ratio of about 4:1 by weight.

3. The method of claim 1, wherein the second phenolic extract derived from pomegranate peels and the first encapsulated powder are mixed at a ratio of about 3:1 by weight.

4. The method of claim 1, wherein the freeze drying each of the first mixture and the second mixture is conducted at about −40° C. under a pressure of about 0.05 bar for about 24 hours.

5. The method of claim 4, wherein the freeze drying of the first mixture is completed when the first phenolic extract derived from pomegranate peels and the dehydrated orange peel powder are present at a ratio of about 7:1 by weight.

6. The method of claim 1, wherein the pomegranate peels are dried at about 40° C. for about 48 hours.

7. The method of claim 1, wherein the ground pomegranate peels have a mean diameter of about 0.1 mm.

8. The method of claim 1, wherein the ground pomegranate peels are soaked in methanol at a ratio of about 1 g: about 10 ml.

9. The method of claim 1, wherein the ground pomegranate peels soaked in methanol are stored in the refrigerator for about 5 days, the percolating is conducted about 5 to about 7 times, the centrifuging occurs at about 10,000 rpm for about 20 minutes, and the evaporating is conducted at about 50° C.

10. The method of claim 1, wherein the dehydrated orange peel powder is obtained by a process comprising:
    (m) peeling an orange to obtain an orange peel;
    (n) separating a white inner fiber portion of the orange peel to obtain an orange pith;
    (o) grinding the orange pith to obtain a ground orange pith;
    (p) soaking the ground orange pith in water to obtain a soaked fibrous pith having a water holding capacity; and
    (q) dehydrating the soaked fibrous pith to obtain the dehydrated orange peel powder.

11. The method of claim 10, wherein the ground orange pith is soaked in the water at about 90° C. for about 20 minutes and the dehydrating occurs in a tray dryer at about 40° C. until a constant weight is maintained.

12. The method of claim 10, wherein the dehydrated orange peel is kept at −30° C. until use.

* * * * *